US012722394B2

(12) United States Patent
Alvarez et al.

(10) Patent No.: US 12,722,394 B2
(45) Date of Patent: Sep. 1, 2026

(54) METHOD AND SYSTEM FOR DETECTING AND CLASSIFYING AIR POCKETS WITHIN INK SUPPLY LINES

(71) Applicant: Xerox Corporation, Norwalk, CT (US)

(72) Inventors: Jorge Alvarez, Webster, NY (US); Jason M. LeFevre, Penfield, NY (US); Seemit Praharaj, Marlborough, NH (US); Varun Sambhy, Pittsford, NY (US); Anthony Condello, Webster, NY (US); Christine A Steurrys, Williamson, NY (US); Douglas K. Herrmann, Webster, NY (US); Peter Gulvin, Webster, NY (US); Mark Petropoulos, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 134 days.

(21) Appl. No.: 18/815,047

(22) Filed: Aug. 26, 2024

(65) Prior Publication Data

US 2026/0054498 A1 Feb. 26, 2026

(51) Int. Cl.
*B41J 2/19* (2006.01)
*B41J 2/195* (2006.01)

(52) U.S. Cl.
CPC ................. *B41J 2/19* (2013.01); *B41J 2/195* (2013.01); *B41J 2202/07* (2013.01)

(58) Field of Classification Search
CPC ........... B41J 2/19; B41J 2/195; B41J 2202/07
See application file for complete search history.

(56) References Cited

U.S. PATENT DOCUMENTS 10,286,678 B2 * 5/2019 Matsunaga ................ B41J 2/19

* cited by examiner

*Primary Examiner* — Geoffrey S Mruk
(74) *Attorney, Agent, or Firm* — Fox Rothschild LLP

(57) ABSTRACT

A print device that includes an ink line and an imaging device is configured to capture images of at least a portion of the ink line. The device is also configured to classify air pockets within the ink line by: receiving one or more images from the imaging device; using an air pocket detection model to identify an air pocket within the ink line; and using a classification model to determine one or more characteristic labels for the air pocket. The print device will use the characteristic labels to take an action corresponding to the air pocket.

20 Claims, 8 Drawing Sheets

METHOD AND SYSTEM FOR DETECTING AND CLASSIFYING AIR POCKETS WITHIN INK SUPPLY LINES

BACKGROUND

Ink jet printers operate by ejecting small droplets of liquid ink onto print media according to a predetermined pattern. In some implementations, the ink is ejected directly on a final print media, such as paper. In other implementations, the ink is ejected on an intermediate print media, e.g. a print drum, and is then transferred from the intermediate print media to the final print media. Some ink jet printers use cartridges of liquid ink to supply the ink jets. Some printers use phase-change ink which is solid at room temperature and is melted before being jetted onto the print media surface. Phase-change inks that are solid at room temperature allow the ink to be transported and loaded into the ink jet printer in solid form, without the packaging or cartridges typically used for liquid inks.

In a liquid state, ink may contain bubbles that can obstruct the passages of the ink jet pathways. For example, bubbles can form in solid ink printers due to the solidify-melt cycles of the ink that occur as the ink cools and solidifies when printer is powered down and melts when the printer is powered up for use. As the ink becomes a solid, it contracts, forming voids in the ink that can be subsequently filled by air. When the solid ink melts prior to ink jetting, the air in the voids can become bubbles in the liquid ink. In an aqueous ink system, ink may be introduced into the machine with bubbles, or bubbles may form from air that enters the system through porous tubing or small openings in fittings, couplings or valves.

Enclosed air pockets (bubbles) in the fluid path of an ink jet print head can lead to temporary ejection failure of jets due to temporary absence of ink or simply disturb the acoustic performance of the ink jet when trapped near the manifold (i.e., inability of the jets to maintain meniscus). Although bubbles can form in any type of ink, the formation of bubbles may be a heightened issue for phase change inks, which may shrink by as much as 15% during solidification. The high forces associated with phase changes and the complex and often rigid channel geometries lead to voids caused by delamination, cracking and air leakage or outgassing of components. After melting occurs, the voids become bubbles and mobilize and follow the ink flow towards the jets. Further, if foreign matter, such as paper dust or the like, or congealed ink or the like adheres to a nozzle face, surface tension is altered and ejection direction defects occur. Therefore, an operation of maintenance by wiping is necessary.

Air voids affect can not only affect a current print job, they can also create longer-term maintenance issues. When air bubbles reach a print head, they can cause pressure problems and missing jets. Air is also more difficult to remove from the print head than from it is from the ink lines.

In a case in which it is not possible to detect occurrences of defective ejections, such as ejection failures, ejection direction defects and the like, it is necessary to perform periodic maintenance. Consequently, this results in wastes of time and ink. Further, as mentioned above, maintenance operations include suction and wiping.

This document describes methods and systems that are directed to solving the issues described above.

SUMMARY

In one aspect, a print device that includes an ink line and an imaging device is configured to capture images of at least a portion of the ink line. The device is also configured to classify air pockets within the ink line by: receiving one or more images from the imaging device; using an air pocket detection model to identify an air pocket within the ink line; and using a classification model to determine one or more characteristic labels for the air pocket. The print device will use the characteristic labels to take an action corresponding to the air pocket.

In a second aspect, a print device includes an ink line and a sensor configured to measure capacitance of a first portion of the ink line. The print device is configured to monitor, based on the sensor data, capacitance of the first portion of the ink line. The system will identify an air pocket in the ink line in response to detecting a decrease in the capacitance of the first portion of the ink line.

DETAILED DESCRIPTION

Figure 1:
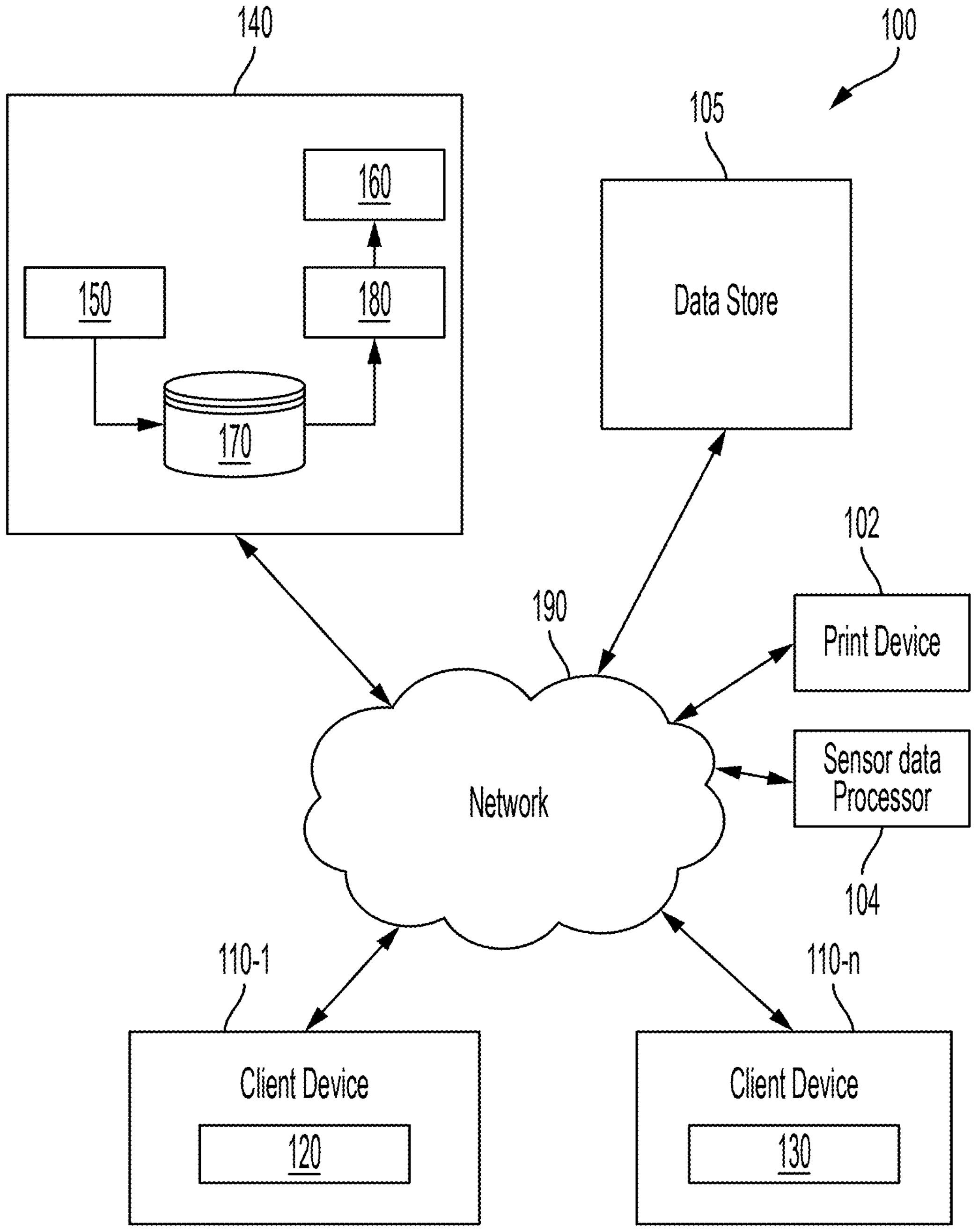
FIG. 1 illustrates a schematic view of a system for detecting and classifying air pockets within ink lines of a print device.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

The term "meniscus" refers to an attraction of a liquid, such as ink, to a material surrounding an opening in a material, such as a pore in a membrane positioned across a path for the liquid. The meniscus holds the liquid in the pore until a higher pressure is reached that breaks the liquid attraction to itself and/or the membrane material and pulls gas through the pore. Consequently, a membrane having wetted pores enables liquids to be pulled through the pores of the membrane while preventing a gas from passing through the membrane as long as the pressure across the wetted pores remains below the pressure that breaks the meniscus. The term "ink line" refers to a body having a passageway or lumen through it for the transport of a liquid (ink) or a gas (air pockets). As used herein, "purging ink" refers to any emission of ink from an inkjet ejector that does not land on an image receiving member whether deliberate or accidental. Purged ink refers to ink emitted from the ejector during purging.

As used herein, the terms "identify" (or "detect") and "classify," and the terms "identification" (or "detection") and "classification," may be utilized interchangeably. For example, in accordance with certain embodiments of the present disclosure, a vision system (as further described herein) may be configured (e.g., with a machine learning system) to collect any type of information that can be utilized within an inkjet printing system to identify and classify air pockets in ink lines of the printing system based on an image classification model.

As discussed above, in an inkjet printing system air bubbles can cause a variety of issues that affect print quality, that make maintenance more difficult, or both. Air can get in the ink supply line with faulty dampers, dry-break couplings cracked tubing, permeable tubing, malfunctioning of degasser, loose connections, or the like. Air pockets or bubbles may form not in the ink supply lines but also the ink waste lines. Furthermore, air bubbles tend to coalesce due to surface tension forming larger air bubbles or foam that cannot be purged by simple flushing. Specifically, undetected and uncorrected air pockets within ink lines will continue to grow in size and may lead to air ingestion by the print head. This often results in an expensive printhead replacement service call in the field.

While there are some existing ways to detect air pockets, they are typically intrusive to the ink lines themselves and tend to introduce more air into the ink lines. Moreover, ink lines are often located in space that is not visibly accessible due to covers and frames. For example, in a typical print device, there are numerous wires, metals brackets and electromagnetic emission shields that obscure and/or prevent visible access to ink lines in the print bar stations. A user, therefore, has to periodically stop the print device and pull out each one of the plurality of print bars one at a time and inspect for potential air bubbles. These actions represent productivity losses and introduce potential errors in assessing the presence of air bubbles due to limited visibility and access. As such, there exists a need for a system that is of low cost and has the ability to timely detect air pockets and/or generate alerts to a user for providing maintenance.

The current disclosure describes systems and methods for detection and classification of bubbles within ink lines by capturing images of one or more portions of such ink lines, and machine learning based image analysis.

Referring now to FIG. 1, a schematic illustration of a system 100 for detection and classification of air bubbles within ink lines is shown. In various implementations, the system 100 may include a print device 102, a plurality of client devices 110-1, . . . , 110-*n*, an image analyzer 140, and data store 105. Each of the plurality of client devices 110-1, . . . , 110-*n*, the image analyzer 140, and the data sources 105 may be implemented in one or more computers that communicate with each other and with the print device 102, for example, through a computer network 190. The image analyzer 140 is an example of a computing system in which the systems, components, and techniques described herein may be implemented and/or with which systems, components, and techniques described herein may interface. Some of the systems depicted in FIG. 1, such as the image analyzer 140 and the data sources 105, may be implemented using one or more server computing devices that form what is sometimes referred to as a "cloud infrastructure," although this is not required.

An individual (who in the current context may also be referred to as a "user") may operate one or more of the client devices 110-1, . . . , 110-*n* to interact with other components depicted in FIG. 1. Each component depicted in FIG. 1 may be coupled with other components through one or more networks, such as the computer network 190, which may be a local area network (LAN) or wide area network (WAN) such as the Internet. Each of the client devices 110-1, . . . , 110-*n* may be, for example, a print device, a multifunction device, a desktop computing device, a laptop computing device, a tablet computing device, a mobile phone computing device, a standalone interactive speaker (with or without a display), or a wearable apparatus of the participant that includes a computing device (e.g., a watch of the participant having a computing device, glasses of the participant having a computing device). Additional and/or alternative client devices may be provided.

The print device 102, each of the client devices 110-1, . . . , 110-*n* and the image analyzer 140 may include one or more memories for storage of data and software applications, one or more processors for accessing data and executing applications, and other components that facilitate communication over a network. The operations performed by the print device 102, client devices 110-1, . . . , 110-*n* and the image analyzer 140 may be distributed across multiple computer systems. The image analyzer 140 may be implemented as, for example, computer programs running on one or more computers in one or more locations that are coupled to each other through a network.

Each of the client devices 110-1, . . . , 110-*n* may operate a variety of different applications. For example, a first client device 110-1 may operate a training client 120 (e.g., which may be standalone or part of another application, such as part of a web browser), that may allow a user to initiate training, by training module 150 of the image analyzer 140, of the one or more machine learning models (e.g., instance segmentation models, deep learning models, etc. discussed below) in the machine learning model database 170 of the image analyzer 140 to generate output that is indicative of, for instance, an air pocket identified in an ink line and/or associated characteristics. Another client device 110-*n* may operate a prediction client 130 that allows a user to initiate and/or study air pocket related characteristics, classifications, and other predictions provided by the inference module 160 of the image analyzer 140, using one or more of machine learning models in the machine learning model database 170 and/or identifications provided by the detection module 180 of the image analyzer 140.

The image analyzer 140 may be configured to practice selected aspects of the present disclosure to provide users, e.g., a user interacting with the prediction client 130, with data related to seed germination predictions. In various implementations, the image analyzer 140 may include a training module 150, an inference module 160, a model database 170, and a detection module 180. In other implementations, one or more of the training module 150, the inference module 160, the model database 170, and the detection module 180 may be combined and/or omitted.

The training module 150 may be configured to train or one more machine learning models to generate data or output indicative of identification and/or classification (e.g., based on one or more characteristics) of air pockets in ink lines. These machine learning models may be applicable in various ways under various circumstances.

In various embodiments, a first machine learning model may be an air pocket detection model (e.g., an instance segmentation model) trained to detect or identify individual instances of air pockets in an image of an ink line. In various other embodiments, a second machine learning model may be trained to generate classification data for each of the individual instances of air pockets in an image. The classification may then be used to determine a potential action (e.g., issue an alert, initiate a purge action, stop printing, etc.). Optionally, a single model may be used to identify as well as classify the air pockets in images, and/or make predict actions.

The machine learning models trained by the training module 150 may take various forms. In some implementations, one or more machine learning models trained by the training module 150 may come in the form of neural networks. These may include, for instance, convolutional neural networks. In other implementations, the machine learning models trained by the training module 150 may include other types of neural networks and any other type of artificial intelligence model. In various implementations, the training module 150 may store the machine learning models it trains in a machine learning model database 170.

In some implementations, the training module 150 may be configured to receive, obtain, and/or retrieve training data in the form of observational data and/or images described herein and apply it across a neural network (e.g., a convolutional neural network) to generate output. The training data may be synthetically generated images and/or real images corresponding to ink lines. The training module 150 may compare the output to a ground truth (e.g., labeled images including air pocket classifications and/or identifications, etc.), and train the neural network based on a difference or "error" between the output and the ground truth. In some implementations, this may include employing techniques such as gradient descent and/or back propagation to adjust various parameters and/or weights of the neural network. Other types of machine learning models such as deep learning models (e.g., autoencoders, multilayer perceptrons, etc.) are within the scope of this disclosure. In some embodiments, the machine learning model is trained to perform instance segmentation of images captured for ink lines that is trained and validated using a large dataset of ink line images of a print device. In some embodiments, the machine learning model is a deep learning model trained to perform multiclass and multilabel classification of images of ink lines that is trained and validated using a large dataset of images of ink lines.

Figure 4:
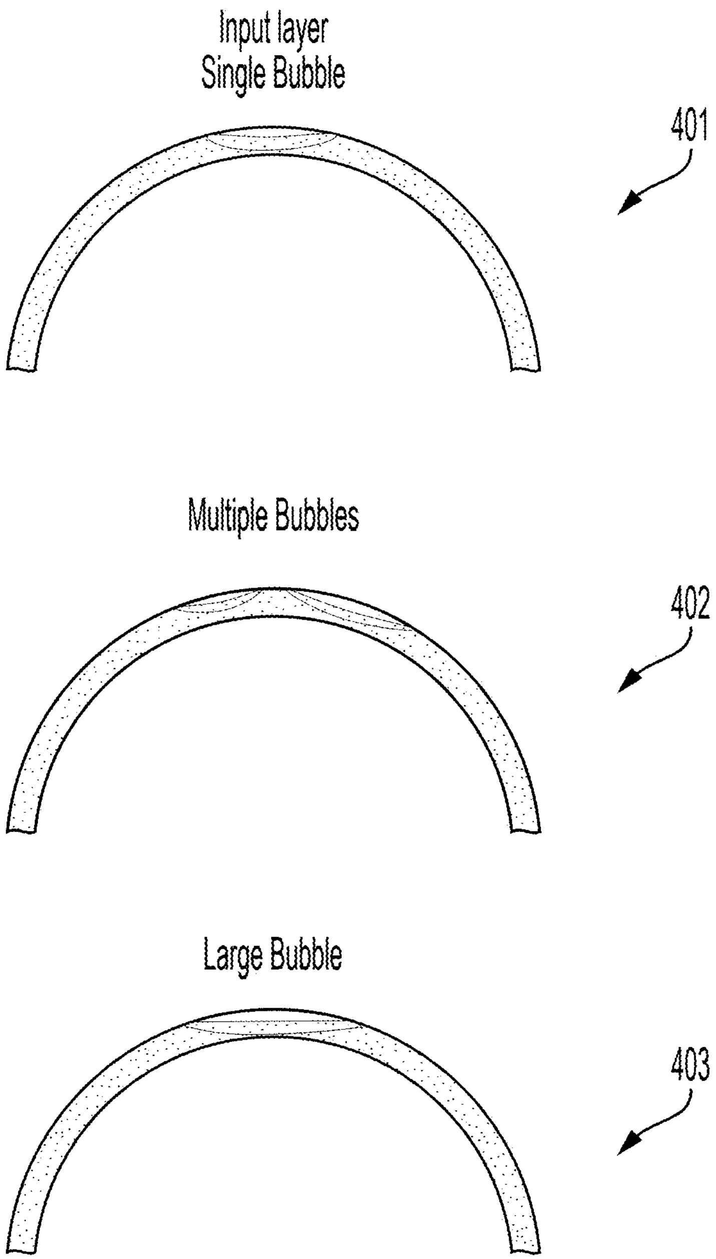
FIG. 4 illustrates example images in a training dataset.

For example, during the training stage, a plurality of different types of air pockets may be created within ink lines, which are the control samples, may be flown past an imaging device in the print device so that the machine learning system detects, extracts, and learns what features visually represent such exemplary air pockets. In other words, images of air pockets pieces such as shown in FIG. 4 may be first passed through such a training stage so that the machine learning algorithm "learns" how to detect, recognize, and classify air pockets. FIG. 4 illustrates examples of images that can be included in a training dataset including, for example, images of ink lines with single air pockets (401), images of ink lines with multiple air pockets (402), images of ink lines with air pockets of different sizes (403, in which the air pocket or bubble is larger than that of example 101), images of ink lines with a foamy air pockets, or the like.

One point of mention here is that the detected/extracted features (e.g., observed characteristics) are not necessarily lack of ink, reduction in ink density etc. at certain points within ink lines; they can be abstract formulations that can only be expressed mathematically, or not mathematically at all; nevertheless, the machine learning system parses all of the data to look for patterns (e.g., observable) that allow the control samples to be classified during the training stage. The machine learning system may take subsections of a captured image of an ink line and attempt to find correlations between the pre-defined classifications.

The detection module 180 and/or inference module 160 may be configured to apply input data across trained machine learning models contained in the machine learning model database 170. These may include machine learning models trained by the training module 150 and/or machine learning models trained elsewhere and uploaded to the machine learning model database 170. Similar to the training module 150, in some implementations, the detection module 180 and/or the inference module 160 may be configured to receive, obtain, and/or retrieve observational data and/or images apply it across a neural network to generate output including air pocket instance identifications, classifications, and/or corresponding actions. Assuming the neural network is trained, then the output may be indicative of various detections and characteristics of the air pockets, which may then be used by the prediction client to predict an action to be takes (e.g., issue an alert, perform a corrective action to remove an air pocket such as purging or suction, stop a print job, etc.). Optionally, the prediction client may use look-up tables, rules, and/or machine learning models to make predictions based on the information received from the inference module and the detection module.

The training module 150, the detection module 180, and/or the inference module 160 may receive, obtain, and/or retrieve input data from various sources, such as the data sources 105. This data received, obtained, and/or retrieved from the data sources 105 may include observational data and/or images (e.g., images of ink lines with and/or without air pockets). The observational data may include data that is obtained from various sources, including but not limited to other sensors in the print device (for example, pressure sensors, image quality sensors, print head fault detectors, users, and so forth. In implementations, a source of images may be a plurality of digital images of a plurality of ink lines, e.g., using a multi-camera array installed at suitable locations within a print device or system. The digital images may have sufficient spatial resolution such that, when they are applied as input across one or more of the machine learning models in the machine learning model database 170, the models generate output that is likely to accurately detect and/or classify the air pockets, which may then be used by the prediction client to accurately predict an action.

Optionally, the system 100 may also include a sensor data processor 104 configured to receive and analyze sensor data received from one or more sensors included in the print device 102 and/or coupled to components (e.g., ink lines) of the print device 102.

Figure 2:
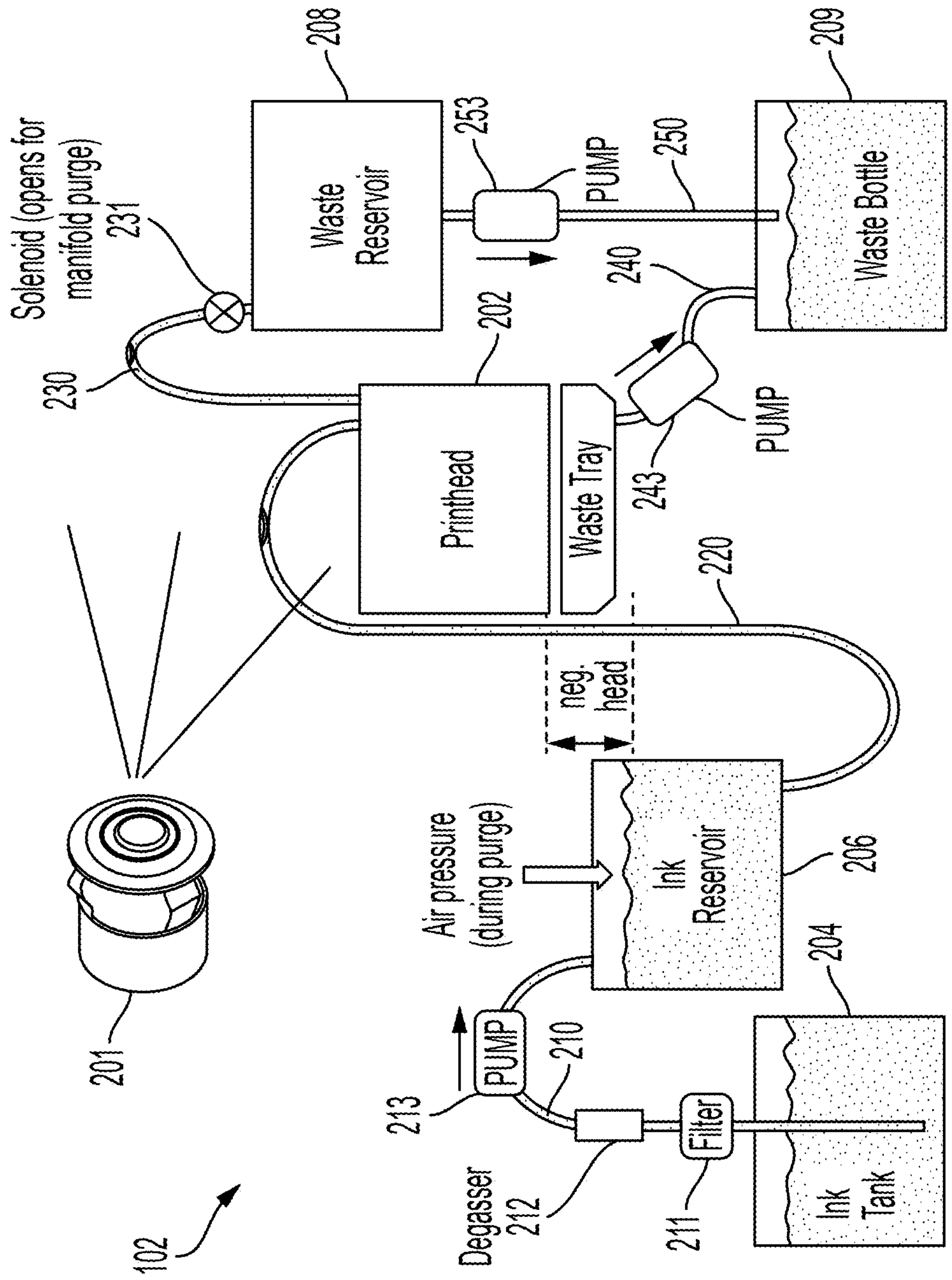
FIG. 2 illustrates a schematic view of an imaging device in association with a print device of FIG. 1.

FIG. 2 shows a schematic illustration of an ink path within the ink lines of a print device 102, and an imaging device 201 configured to monitor the ink flow withing the ink lines. As shown in FIG. 2, the print device 102 may be a printer that includes multiple printheads (e.g., printhead 202) that are used to dispense different fluids. For example, a storage container 204 may serve as an ink tank to store printing fluid that is dispensed to the printhead 202 via, for example, an ink reservoir 206. A filter 211 (for filtering impurities), degasser 212 (for removing entrapped gas or air pockets), pump 213 (for maintaining suitable fluid pressure), or other components may be included in the ink line 210 between the storage container 204 and the ink reservoir 206. Ink line 220 may supply ink from the ink reservoir 206 to the printhead 202. Optionally, purging for removal of air pockets in the ink line 220 may be performed by application of air pressure over the ink in the ink reservoir. As shown in FIG. 2, the storage container 204 is located at a vertical height that is below the vertical height of the ink reservoir 206, and the ink reservoir 206 is located at a vertical height that is below the vertical height of the printhead 202. This arrangement enables ink to ascend to and be held in the printhead 202 using capillary action. A waste reservoir 208 may be connected to the printhead 202 via another ink line 230, where the ink line 230 may include, for example, a solenoid 231 configured for performing a manifold purge. Optionally, another waste container 209 may be provided and fluidly coupled to the print head 202 and/or the waste reservoir 208 via ink line(s) 240, 250 and optional pumps 243, 253.

Typically, the air pockets in ink lines are formed or collect at high points or loops present in the ink lines. For example, in the system shown in FIG. 2, air pockets may form in at or proximate to the high or apex points 221 (in ink line 220) and 222 (in ink line 230). As such, one or more imaging devices (e.g., imaging device 201 of FIG. 2) may be positioned and/or oriented to monitor and capture images of such high points. Other points that are known or observed to collect/form air pockets may similarly be monitored, and images may be captured accordingly. Images of the ink lines may be captured at suitable intervals (e.g., at suitable time intervals, during a print job, when the print device is idle, etc.) and/or continuously to detect the presence of air pockets and/or their characteristics. Any suitable image capture device may be used.

It should be noted that the system 200 has been simplified for ease of explanation and may include additional components which are not shown. For example, the system 200 may include a motor to move the printheads, a memory to store instructions, a power supply, other electrical components, a controller, and the like.

Figure 3:
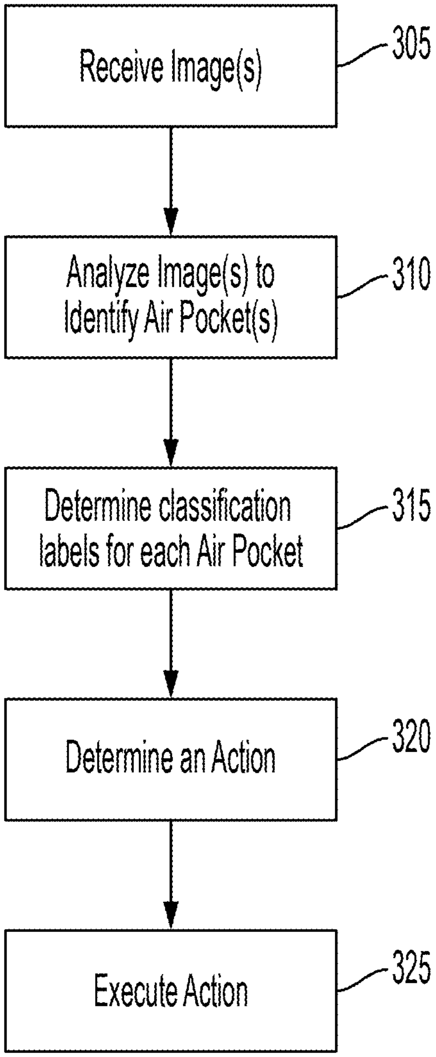
FIG. 3 is a flow diagram illustrating an example process for detecting and classifying air pockets within ink lines of a print device using an imaging device.

FIG. 3 is a flowchart illustrating an example method 300 of identifying and classifying air pockets in ink lines, in accordance with implementations disclosed herein. For convenience, the operations of the flowchart are described with reference to a system that performs the operations. This system may include various components of various computer systems, such as one or more components of the print device 102, client devices 110-1, . . . , **110-*n*, the image analyzer 140, and/or the data sources 105. Moreover, while operations of method 300** are shown in a particular order, this is not meant to be limiting. One or more operations may be reordered, omitted, or added.

At block 305, the system may obtain one or more images from an imaging device configured to monitor and image ink lines within a print device. As discussed above, the images may be captured periodically at certain intervals, continuously, continuously only while executing a print job (otherwise periodically), at the start of a print job, at the end of a print job, at the start and/or end of a printing shift, after a certain number of print jobs, or the like. In implementations, at block 305, system may receive a request to monitor ink lines from, for example, a client device. In response to receiving the request, the system may obtain at least one digital image from the data sources and/or imaging devices of the system. In implementations, the digital image may be a RGB (red/green/blue) image. In other implementations, the digital image may be black and white image (in which case color of the ink does not impact detection/classification of air pockets).

Still referring to FIG. 3, at block 310, the system may analyze the received image(s) to identify (e.g., using an air pocket detection model) occurrence of one or more air pockets within each of the image(s). As discussed above the air pocket detection model may be any suitable model trained to detect presence of one or more air pockets within ink lines. In implementations, the detection module (discussed above) may identify the pixel boundaries of each of the air pockets in the digital image, using a trained model. Optionally, the system may identify the position (i.e., location and timing) of each identified air pocket within an ink line.

At 315, the system may be further configured to perform classification (e.g., based on one or more characteristics) of the detected air pockets (e.g., using a classification module trained to determine the characteristics of the air pockets). For example, the system (e.g., the inference module) may determine the color, hue, size, shape, number, overall physical appearance, uniformity, or other information about the air pockets.

The characteristics may be selected to determine or predict an action to be taken upon detection of an air pocket within an ink line. In an implementation, the characteristics include, without limitation, size, number, shape, proximity to print head or other components within the print device, proximity to other air pockets within an ink line, location in the ink supply or the return (waste) line, or the like. Optionally, a tracking model may be trained and used to track an identified air pocket as it travels in an ink and determine, for example, other characteristics or features such as the change in size of the air pocket, velocity of the air pocket, rate of change of size of the air pocket, change or rate of change of number of air pockets in a particular ink line, or the like.

Other characteristics may similarly be selected. The air pockets may be assigned to more than one class. In certain implementations, because of the multilabel condition of the problem a class (i.e., a characteristic) is assigned to the image when the associated output coefficient is larger than a threshold value. Example threshold values may be about 0.25-0.4, about 0.27-0.38, about 0.29-0.36, about 0.3-0.35, about 0.29, about 0.3, about, 0.31, or the like.

As discussed above, the machine learning model may be trained and validated to perform multiclass and multilabel classification of air pockets in images of ink lines using a training dataset of air pockets (synthetic and/or real) to classify and label the air pockets based on the characteristics. For example, for training and using the detection, classification, and/or the tracking models, the system may implement one or more any well-known machine learning algorithms, including one that implements a neural network (e.g., artificial neural network, deep neural network, convolutional neural network, recurrent neural network, autoencoders, reinforcement learning, etc.), fuzzy logic, artificial intelligence ("AI"), deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.) and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning algorithms, software, and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPOT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

Still referring to FIG. 3, the class labels (i.e., inferred characteristics) for each of the air pockets may be used to determine or predict an air pocket removal action or other action to be taken by the system (block 320). Examples of the actions may include, without limitation: perform a corrective action to remove an air pocket such as purging or suction; clarify what the suction method is; determine whether to create a suction into the air lines or (undesirably) at the face of the head (undesirable because the air would be pulled to the jets and become difficult to remove), stop a print job, alert a user, or the like. For example, if the air pocket is determined to be within a threshold distance of a print head, the system may stop a print job and/or generate an alert to a user that the print device needs maintenance. Alternatively, an alert can be issued to a service technician without stopping the machine or alerting the operator. Such a non-urgent communication may be used in the case of typical, slow growing air bubbles that cause no immediate harm. This can be done by limiting the alert to the service login level or a remote method such as a machine data log or an electronic communication.

Table 1 below illustrates example actions to be taken based on the classification labels of an air pocket:

TABLE 1

| Number of air pockets | Size | Action |
|---|---|---|
| single | small | No action |
| multiple | small | No action |
| single | large | Alert operator and maintenance technician |
| multiple | large | Alert operator and maintenance technician |

In the examples in Table 1 above, a large bubble could have a diameter of 1 inch or larger, and a smaller bubble could have a diameter of less than an inch. Other sizes are possible, in which the terms "small" and "large" have their common meanings with respect to each other.

At 325, the system may cause the action to execute. For example, the system may send an instruction to a controller of the print device to stop a print job. In another example, the system may send instructions to a controller of a purging system (e.g., a pump) to initiate purging.

In some implementations, the air pocket classification labels (e.g., characteristics) and corresponding action are output (e.g., as a visual output) and a display device.

It should be noted that while the above disclosure describes the identification and classification of air pockets or bubbles in the ink lines of a print device, the disclosure is not so limiting. The above image analysis can be used for, for example, identification of impurities (e.g., sediment in the ink lines), discoloration of ink lines (e.g., due to age) as an indication of the quality of the ink like, staining characteristics of the ink lines, presence of a wrong color ink in the ink lines (e.g., compared to what is required for a print job and/or what the ink line is configured to have); backing up of ink (from a waste ink line) of a different color into a print head and/or a supply ink line, or the like; without deviating from the principles of this disclosure. For example, a color density of an area in the ink line that is above a threshold value may be indicative of sediment within an ink line.

It should also be noted that similar principles can be used to identify/classify air pockets and/or the above artifacts by analyzing (e.g., using trained models) data from other types of sensors such as, without limitation, laser sensors, sound sensors, capacitive sensors, or the like.

Figure 5A:
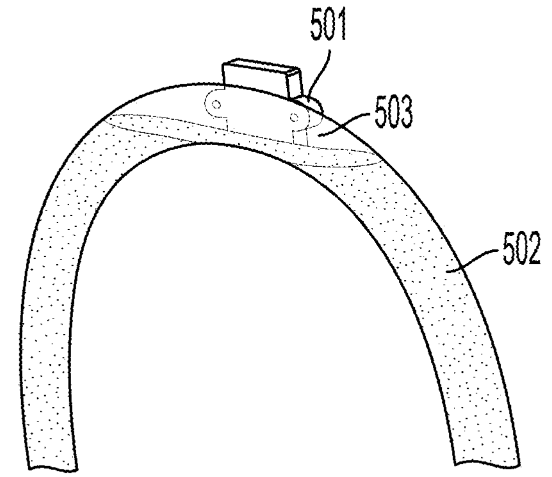
FIG. 5A illustrates an example ink line with a capacitive sensor coupled to an apex point.
Figure 5B:
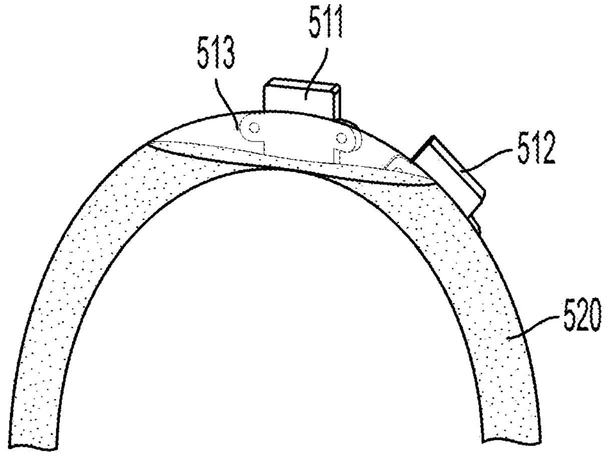
FIG. 5B illustrates an example ink line with a capacitive sensor coupled to an apex point and a capacitive sensor coupled to an offset point downstream the apex point.
Figure 5C:
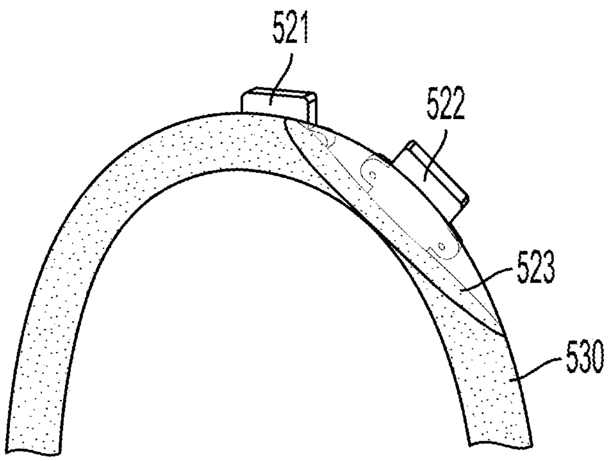
FIG. 5C illustrates an example ink line with a capacitive sensor coupled to an apex point and a capacitive sensor coupled to an offset point downstream the apex point.

For example, FIGS. 5A, 5B, and 5C illustrate the use of one or more capacitive sensors for detection of air pockets in ink lines, and for determining an action to be taken. The capacitive sensors can be coupled to the ink lines (shown in FIG. 2) of the print device 102 (of FIG. 1). In various implementations, one or more capacitive non-contact liquid level sensors are positioned with respect to the ink lines (e.g., by attaching to the outside of an ink line) to detect and characterize the air pockets within the ink line without direct contact with the ink. Such sensors use the added capacitance of the ink to detect the presence or absence of the liquid ink within an ink line. When in ink line is filled with liquid ink, the capacitance will increase with the increase of the inner dielectric constant. However, when there is an air pocket (i.e., no ink in ink line) at the sensor location, then the sensor capacitance will decrease indicating presence of an air pocket in the ink line. In an example implementation, the capacitive sensors run at a voltage of about 5V and the output signal is compatible for being detected or read by a processor of the print device itself. The measurements from the capacitive sensors of the system are used to detect a change in capacitance caused by the presence or absence of ink from outside of the supply/waste tubing without intrusion into the supply hoses themselves. This eliminates issues caused by physically contacting the ink or introducing air into the system via leaks at the measurement point.

As discussed above, air pockets tend to form at the apex (high points) and/or loops within ink lines. In certain implementations, this knowledge is leveraged to position capacitive sensors at and/or near the apex to continuously monitor the capacitance and voltage output, and to detect the presence and size of an air pockets in an ink line (e.g., at the apex in an ink line), which knowledge can then be used by the system to detect air in the supply and waste ink lines.

For example, as shown in FIG. 5A, an apex capacitive sensor 501 may be coupled or attached at or near the apex point of an ink line 502 (e.g., the apex points 221 and/or 222 of FIG. 2). As shown in FIG. 5A, the capacitance measured by the sensor 501 when the bubble 503 passes through the portion of the ink line being monitored. FIG. 5B illustrates an ink line including two capacitive sensors—an apex sensor 511 and an offset sensor 512 that is offset from and in a downstream location with respect to the apex sensor 511, coupled to the ink line 520. FIG. 5B illustrates a single air bubble 513 being simultaneously detected by sensors 511 and 512. FIG. 5C illustrates an ink line including two capacitive sensors—an apex sensor 521 and an offset sensor 522 that is offset from and in a downstream location with respect to the apex sensor 521, coupled to the ink line 530. FIG. 5C illustrates the air bubble 523 being detected by sensor 522 after initiation of a purge action, the purge action being detected after a previous detection of the air bubble 523 by sensor 521, illustrating downstream movement of the air bubble in the ink line. In various embodiments, the offset distance between an apex sensor and an offset sensor may be determined based on the characteristic of the air pocket to be determined using the sensors. For example, the offset distance may be about 1 inch or greater and configured to determine the size of the air pockets (i.e., when air pockets span both sensors) as shown in FIG. 5B. Additionally and/or alternatively, the offset distance may be about 1 inch or greater and configured to determine movement, and timing of the air pockets (e.g., during a purge operation) as shown in FIG. 5C. While the figures show the use of one or two capacitive sensors, the disclosure is not limiting with respect to the number of sensors and/or their location with respect to the ink lines (other positions and number of sensors are within the scope of this disclosure). Additionally, the presence of the offset sensor at a known distance in combination with timing of movement of the air pocket from the apex sensor to the offset sensor during a controlled ink movement allows for the size of the air pocket to be determined.

As such, ink lines can be monitored in real time and continuously for the presence of a destructive air bubble within the ink lines. Moreover, the capacitive sensors can be used to characterize the air pockets. For example, air pockets can be characterized based on the number of capacitive sensors they span at any given time (e.g., if an air pocket is being sensed by both the apex and the offset sensor, the size of the air pocket can be determined based on the offset sensor between the two sensors). In another example, the time taken by an air pocket between being sensed by a first capacitive sensor followed by a second capacitive sensor can be used to characterize that air pocket (discussed below in more detail).

Figure 6:
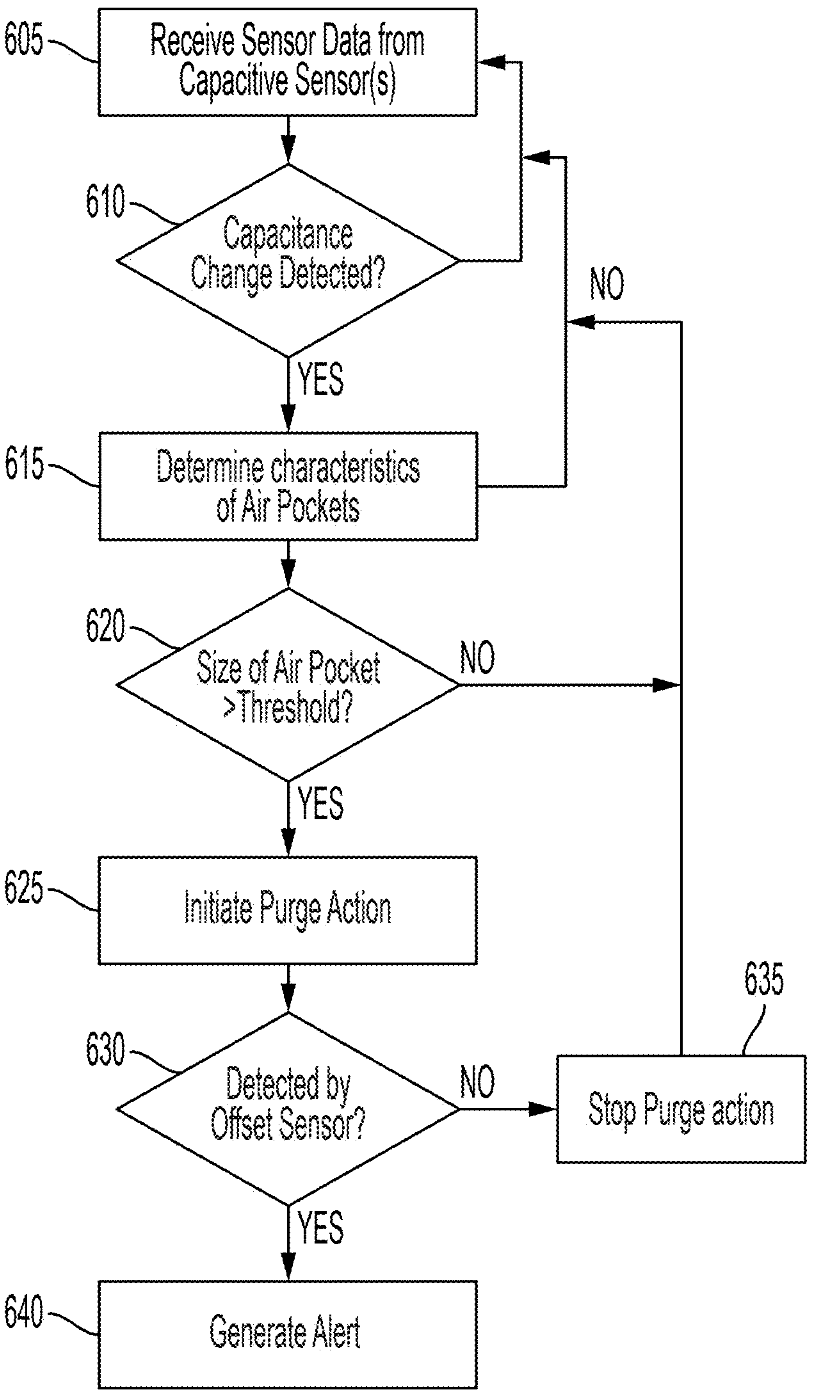
FIG. 6 is a flow diagram illustrating an example process for detecting and classifying air pockets within ink lines of a print device using capacitive sensors.

Referring now to FIG. 6, is a flowchart illustrating an example method 600 of identifying and classifying air pockets in ink lines, in accordance with implementations disclosed herein. For convenience, the operations of the flowchart are described with reference to a system that performs the operations. This system may include various components of various computer systems, such as one or more components of the print device 102, client devices 110-1, . . . , 110-*n*, the sensor data processor 104, and/or the data sources 105. Moreover, while operations of method 600 are shown in a particular order, this is not meant to be limiting. One or more operations may be reordered, omitted, or added.

At block 605, the system may obtain sensor data from capacitive sensor(s) coupled to and/or configured to measure capacitance data of ink lines within a print device. Sensor data may be captured periodically at certain intervals, continuously, continuously only while executing a print job (otherwise periodically), at the start of a print job, at the end of a print job, at the start and/or end of a printing shift, after a certain number of print jobs, or the like. In implementations, at block 605, the system may receive a request to collect capacitance data corresponding to ink lines from, for example, a client device.

At block 610, the system may analyze the received sensor data to determine whether the capacitance of the ink line has changed indicative of the occurrence of one or more air pockets within ink line. As discussed above, presence of an air pocket within an ink line causes a drop in the capacitance of the ink line. Optionally, the system may identify the position (i.e., location and timing) of each identified air pocket within an ink line. If an air pocket is not detected (i.e., 610: NO) when the capacitance remains unchanged, the system may continue collecting and analyzing the sensor data from the sensor(s).

If an air pocket is detected (610: YES), at 615 the system may determine one or more characteristics of the air pockets. For example, the system may determine the size, shape, number, or other information about the air pockets. For example, the size of the air pocket may be determined based on the drop in capacitance, the area being spanned by the air pocket (e.g., the size may correspond to the offset distance between an apex sensor and an offset sensor when being simultaneously detected by both the apex sensor and the offset sensor), as a particular size (such as 1 inch or greater), or the like.

At 620, the system may determine whether the size of the air pocket is greater than a threshold size. For example, the threshold size may be about one inch in diameter or maximum lateral dimension; other sizes are possible. If the size is less than, the threshold the system may continue to monitor the ink line.

If the size of the air pocket is determined to be greater than the threshold size (620: YES), the system may initiate or cause the print device to initiate a purge action (625). In some embodiments, the purge action (625) may be of the type generally known as a manifold purge, in which the solenoid (231 of FIG. 2) opens and the system which uses a lower pressure than a standard (jetstack) purge for the device. This allows most of the ink (and air) to flow through the ink manifold of a print head and into the waste tank, rather than ending up in the jetstack of the print head. Upon initiation of the purge cycle, if the air pocket is not detected by the offset sensor (630) within a threshold time (e.g., about 2.5 seconds or the like), the system may stop the purge action and cause the print device to resume normal function (635).

If an air pocket is detected by the offset sensor within a threshold time (625: NO), the system may determine that the air pocket is large enough to cause print head issues and generate an alert to a user (640) for initiating a suitable maintenance action (e.g., check supply or waste lines for issues, initiate suction or purge, or the like). Optionally, the alert may be generated only if the time between detection of the air pocket by the apex sensor and the detection of the air pocket by the offset sensor is below a threshold. If an air pocket occurs suddenly (i.e., the time lapse is below the threshold), this may be an indication of an active leak. This leak would also likely cause an overpressure fault which also may generate an alert to the user. A benefit of the sensor would be to determine where the leak originated thus directing the service technician to the faulty part.

Additionally and/or alternatively, the alert may be generated if a size of the air pocket determined based on the time between detection of the air pocket by the apex sensor and the detection of the air pocket by the offset sensor (in association with the purge pressure/ink velocity during purging) is greater than a threshold. If the size is not greater than a threshold, the purge operation may be stopped, and the system may cause the print device to resume normal function (630).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Hence, features from different embodiments disclosed herein may be freely combined. For example, one or more features from a method embodiment may be combined with any of the product embodiments. Similarly, features from a product embodiment may be combined with any of the method embodiments herein disclosed. Thus, the breadth and scope of the present solution should not be limited by any of the above-described embodiments. Rather, the scope of the present solution should be defined in accordance with the following claims and their equivalents.

Figure 7:
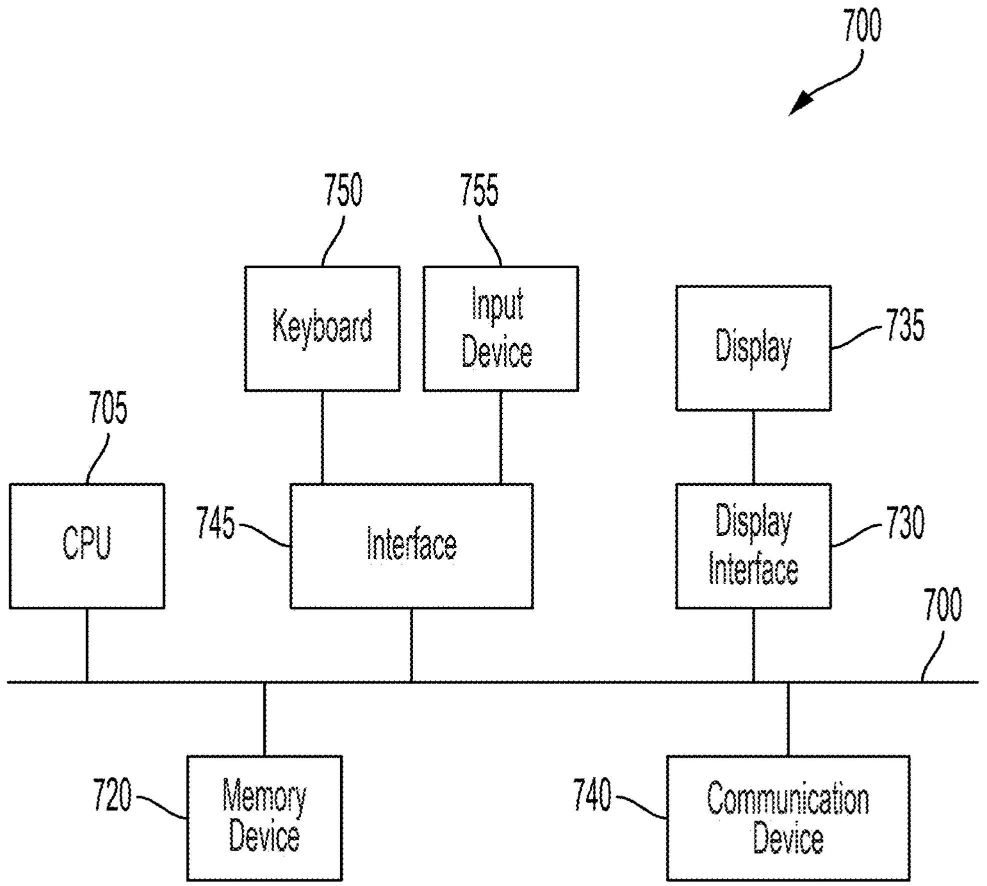
FIG. 7 illustrates example components of computing devices that may implement various embodiments described in this document.

FIG. 7 depicts an example of internal hardware that may be included in any of the electronic components of the system, such as in the print device, in a computing device, etc. One or more conductive busses 700 serve as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication systems. The communication device 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from an imaging device 720, such as a camera or scanner, that can capture video and/or still images. The system also may include a print device 770.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "computer-readable storage medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the terms "printer" and "print device" refer to a machine having hardware capable of reading a digital document file and using the information from the file and associated print instructions to print a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device. A print device also may include a processor and a memory device containing programming instructions and/or stored data. In embodiments that print a 3D object, the print device may be a 3D printer that can use a digital model to successively place layers of build material on a substrate in a configuration that results in a 3D object.

In this document, the term "print job" refers to any set of instructions that when executed, or a process that when performed, will cause a print device to print digital content from one or more digital content files onto a substrate.

The term "imaging device" means a camera, or another device capable of optically viewing an object and converting an interpretation of that object into electronic signals. The erm "image capture module" refers to the software application and/or the image sensing hardware of an electronic device that is used to capture images.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

"Training" of a machine learning may include building and/or updating a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

The features and functions described above, as well as alternatives, may be combined into many other different systems or applications. Various alternatives, modifications, variations or improvements may be made by those skilled in the art, each of which is also intended to be encompassed by the disclosed embodiments.

Without excluding further possible embodiments, certain example embodiments are summarized in the following clauses:

Clause 1: A method of addressing air in a print device ink line includes, by an imaging device, capturing one or more images of at least a portion of an ink line of a print device. The method also incudes, by a processor: (a) using an air pocket detection model to analyze the one or more images to identify, from the one or more images, an air pocket within the ink line; (b) using a classification model to determine one or more characteristic labels for the air pocket; and (c) based on the one or more characteristic labels, causing the print device to take an action corresponding to the air pocket.

Clause 2: The method of clause 1, further comprising the processor initiating the action and/or the print device taking the action.

Clause 3: The method of clause 1 or 2, wherein the action comprises at least one of the following: (a) initiating an air pocket removal action; (b) pausing or stopping a print job; or (c) issuing an alert to a user.

Clause 4: The method of any of clauses 1-3, in which the action comprises, in response to determining that the air pocket has a size that is less than a threshold size, initiating an air pocket removal action that comprises initiating a purge cycle.

Clause 5: The method of any of clauses 1-3, in which the action comprises, in response to determining that the air pocket has a size that is greater than a threshold size, issuing an alert.

Clause 6: The method of any of clauses 1-3, in which the action comprises, in response to determining that a number of air pockets detected within the ink line is less than a threshold, causing the print device to initiate an air pocket removal action that comprises initiating a purge cycle.

Clause 7: The method of any of clauses 1-3, in which the action comprises, in response to determining that a number of air pockets detected within the ink line is greater than a threshold, issuing an alert.

Clause 8: The method of claim any of clauses 1-7, wherein the plurality of characteristic labels comprise at least one of the following of the air pocket: color, hue, size, shape, number, overall physical appearance, uniformity, change in size, velocity, rate of change of size; or a rate of change of number of air pockets in the ink line.

Clause 9: The method of any of clauses 1-8 further comprising, by the imaging device, monitoring a loop or an apex point in the ink line.

Clause 10: The method of method of any of clauses 1-9 further comprising, by the processor, processing a plurality of images to track the air pocket as it travels within the ink line.

Clause 11: A system comprising a print device, an imaging device, a processor, and a non-transitory computer readable storage medium comprising programming instructions that are configured to cause the processor to implement a method according to any of clauses 1-10.

Clause 12: A method comprising, by a first sensor of a print device, measuring capacitance of a first portion of an ink line of the print device. The method also includes, by a processor, executing programming instructions that cause the processor to: (a) receive sensor data from the first sensor; (b) monitor, based on the sensor data, capacitance of the first portion of the ink line; and (c) identify an air pocket in the ink line in response to detecting a decrease in the capacitance of the first portion of the ink line.

Clause 13: The method of clause 12 further comprising, by a second sensor of the print device, measuring capacitance of a second portion of the ink line, the second portion being located downstream of the first portion.

Clause 14: The method of clause 12 or 13, wherein the first portion comprises a loop or an apex point in the ink line.

Clause 15: The method of clause 13 further comprising, by the processor: (a) receiving sensor data from the second sensor; (b) based on the sensor data, monitoring capacitance of the second portion of the ink line; and (c) identifying the air pocket in the second portion of the ink line in response to detecting a decrease in the capacitance of the second portion of the ink line.

Clause 16: The method of clause 15 further comprising, by the processor, determining a size of the air pocket based on at least one of the following: (a) a determination that the air pocket is simultaneously detected within the first portion and the second portion; or (b) a time between detection of the air pocket within the first portion and detection of the air pocket within the second portion.

Clause 17: The method of clause 16 further comprising, by the processor, based on the size of the air pocket, determining an action corresponding to the air pocket.

Clause 18: The method of clause 17 further comprising, by the print device, taking the action.

Clause 19: The method of clause 17, wherein the action comprises at least one of the following: (a) causing the print device to initiate an air pocket removal action; (b) causing the print device to pause or stop a print job; or (c) issuing an alert to a user.

Clause 20: The method of any of clauses 12-19 further comprising, by the processor: (a) initiating a purging action in response to identifying the air pocket; and (b) stopping the purging action if the air pocket is not identified, within a threshold time, based on data from a second sensor configured to measure capacitance of a second portion of the ink line, the second portion being located downstream of the first portion, otherwise continuing the purging action until the air pocket is identify based on data from the second sensor.

Clause 21: The method of any clauses 13-19 further comprising, by the processor: (a) initiating a purging action in print device in response to identifying the air pocket; (b) determining a time between detection of the air pocket within the first portion and detection of the air pocket within the second portion; (c) determining, based on the time, a size of the air pocket; and (d) in response to determining that the size is greater than a threshold size, issuing an alert.

Clause 22: A system comprising a print device, a first sensor configured to measure capacitance of the first portion of the ink line, a processor, and a non-transitory computer readable storage medium comprising programming instructions that are configured to cause the processor to implement a method according to any of clauses 12-21.

Clause 23: A system according to clause 22 further comprising a second sensor, which is configured to measure capacitance of the second portion of the ink line.

The invention claimed is:

1. A system comprising:

a print device comprising an ink line configured to transport ink;

an imaging device configured to capture images of at least a portion of the ink line;

a processor; and a non-transitory computer-readable storage medium comprising programming instructions that are configured to cause the processor to:

receive one or more images from the imaging device, identify, from the one or more images using an air pocket detection model, an air pocket within the ink line, determine, for the air pocket, using a classification model, one or more of characteristic labels for the air pocket, and based on the one or more characteristic labels for the air pocket, cause the print device to take an action corresponding to the air pocket.

2. The system of claim 1, further comprising instructions to cause the processor to initiate the action.

3. The system of claim 1, wherein the action comprises at least one of the following:

causing the print device to initiate an air pocket removal action;

causing the print device to pause or stop a print job; or issuing an alert to a user.

4. The system of claim 1, wherein:

the instructions to cause the print device to take an action comprise instructions to, in response to determining that the air pocket has a size that is less than a threshold size, initiate an air pocket removal action; and the air pocket removal action comprises initiating a purge cycle.

5. The system of claim 1, wherein the instructions to cause the print device to take an action comprise instructions to, in response to determining that the air pocket has a size that is greater than a threshold size, issuing an alert.

6. The system of claim 1, wherein:

the instructions to cause the print device to take an action comprise instructions to, in response to determining that a number of air pockets detected within the ink line is less than a threshold, causing the print device to initiate an air pocket removal action; and the air pocket removal action comprises initiating a purge cycle.

7. The system of claim 1, wherein the instructions to cause the print device to take an action comprise instructions to, in response to determining that a number of air pockets detected within the ink line is greater than a threshold, issuing an alert.

8. The system of claim 1, wherein the one or more characteristic labels comprise at least one of the following of the air pocket: color, hue, size, shape, number, overall physical appearance, uniformity, change in size, velocity, rate of change of size; or a rate of change of number of air pockets in the ink line.

9. The system of claim 1, wherein the imaging device is configured to monitor a loop or an apex point in the ink line.

10. The system of claim 1, further comprising instructions that are configured to cause the processor to process a plurality of images to track the air pocket as it travels within the ink line.

11. A method of addressing air in a print device ink line, the method comprising:

by an imaging device, capturing one or more images of at least a portion of an ink line of a print device; and by a processor:

using an air pocket detection model to analyze the one or more images to identify, from the one or more images, an air pocket within the ink line, using a classification model to determine one or more characteristic labels for the air pocket, and based on the one or more characteristic labels, causing the print device to take an action corresponding to the air pocket.

12. The method of claim 11, further comprising, by the print device, taking the action.

13. The method of claim 11, wherein the action comprises at least one of the following:

initiating an air pocket removal action;

pausing or stopping a print job; or issuing an alert to a user.

14. The method of claim 11, wherein:

the action comprises, in response to determining that the air pocket has a size that is less than a threshold size, initiating an air pocket removal action; and the air pocket removal action comprises initiating a purge cycle.

15. The method of claim 11, wherein the action comprises, in response to determining that the air pocket has a size that is greater than a threshold size, issuing an alert.

16. The method of claim 11, wherein:

the action comprises, in response to determining that a number of air pockets detected within the ink line is less than a threshold, causing the print device to initiate an air pocket removal action; and the air pocket removal action comprises initiating a purge cycle.

17. The method of claim 11, wherein the action comprises, in response to determining that a number of air pockets detected within the ink line is greater than a threshold, issuing an alert.

18. The method of claim 11, wherein the plurality of characteristic labels comprise at least one of the following of the air pocket: color, hue, size, shape, number, overall physical appearance, uniformity, change in size, velocity, rate of change of size; or a rate of change of number of air pockets in the ink line.

19. The method of claim 11 further comprising, by the imaging device, monitoring a loop or an apex point in the ink line.

20. The method of claim 11 further comprising, by the processor, processing a plurality of images to track the air pocket as it travels within the ink line.

* * * * *